United States Patent [19]
Molter et al.

[11] Patent Number: 5,441,621
[45] Date of Patent: Aug. 15, 1995

[54] ELECTROCHEMICAL CELL HAVING CROSSED-RIDGE SEALING SURFACE

[75] Inventors: Trent M. Molter, Enfield; David L. Faye, East Hartford; Wilford J. Armstrong, Bolton, all of Conn.

[73] Assignee: United Technologies Corporation, Hartford, Conn.

[21] Appl. No.: 171,730

[22] Filed: Dec. 22, 1993

[51] Int. Cl.⁶ .................. C25B 9/00; C25B 13/02
[52] U.S. Cl. .................. 204/252; 204/279; 429/35
[58] Field of Search ............ 204/279, 252–258, 204/263–266; 429/34–39

[56] References Cited

U.S. PATENT DOCUMENTS

| | | | |
|---|---|---|---|
| 4,344,832 | 8/1982 | Dahlberg | 429/34 |
| 4,892,632 | 1/1990 | Morris | 204/279 X |
| 5,085,950 | 2/1992 | Primdahl | 429/38 X |

*Primary Examiner*—Donald R. Valentine
*Attorney, Agent, or Firm*—Malcolm J. Chisholm, Jr.

[57] ABSTRACT

Fluid leakage restriction in multi-layered systems that contain fluids such as electrochemical cell devices with sealing surfaces defining patterns of ridges forming concentric rings surrounding through apertures within the surfaces require a new surface design for use of a potential through aperture site. A crossed-ridge sealing surface is comprised of a first plurality of aligned ridges and a second plurality of aligned ridges that crosses the first plurality of aligned ridges to define sealing cells that surround the existing through apertures and potential through aperture sites, so that one sealing surface design may enhance fluid leakage restriction for a variety of actual and potential through apertures.

10 Claims, 2 Drawing Sheets

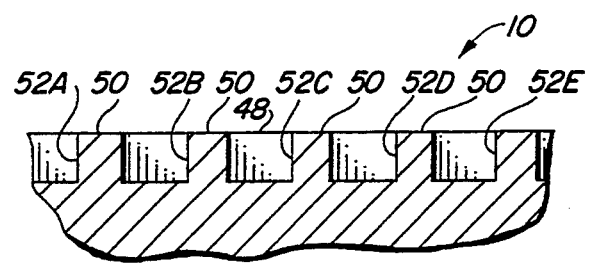
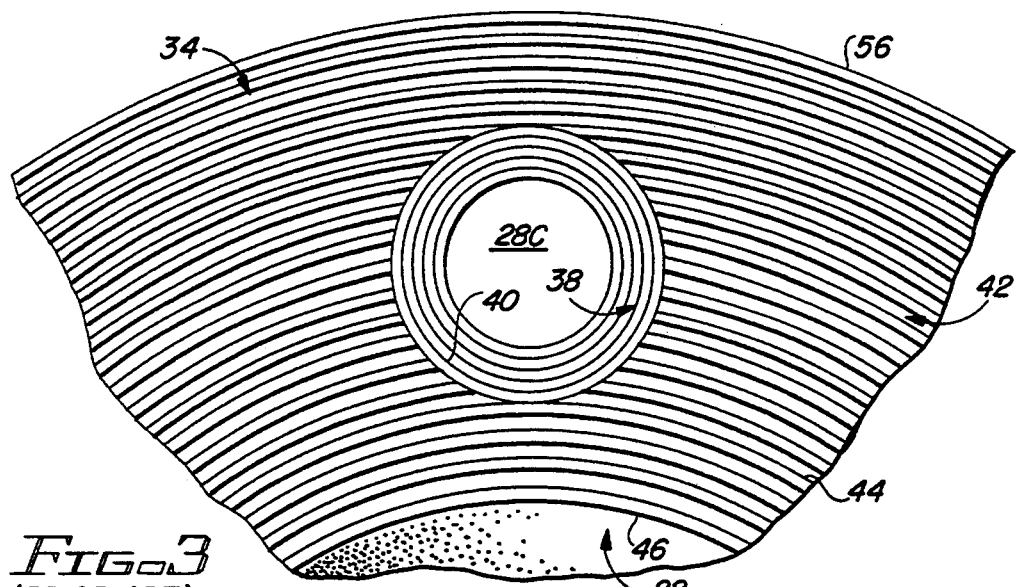
FIG. 3 (PRIOR ART)
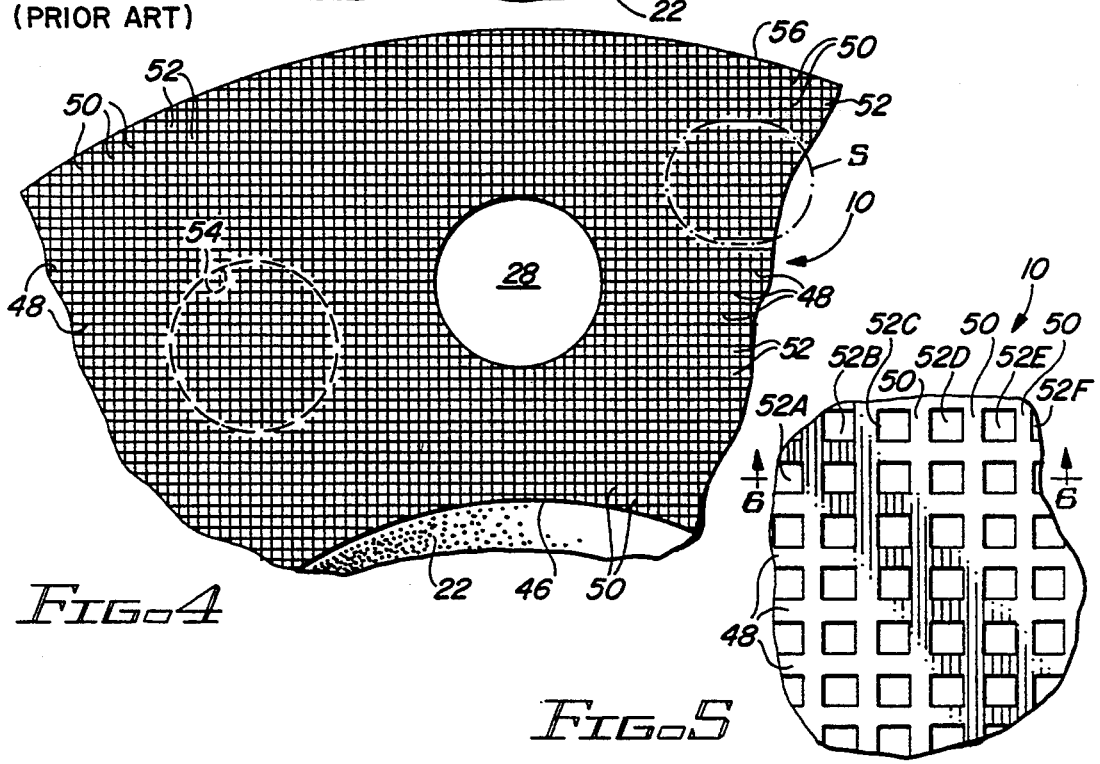

ELECTROCHEMICAL CELL HAVING CROSSED-RIDGE SEALING SURFACE

CROSS REFERENCE TO RELATED APPLICATIONS

Reference is hereby made to commonly owned U.S. patent application Ser. Nos. 07/900,998; 07/991,905; and, 07/991,906, all of which disclose subject matter related to the subject matter of the present application.

1. Technical Field

The present invention relates to improved sealing surfaces for restricting passage of fluids, and especially relates to a crossed-ridge sealing surface for restricting leakage of fluids within a working environment of an electrochemical cell.

2. Background of the Invention

As is well known in the art, electrochemical cell devices typically include a plurality of individual electrochemical cells arranged in vertical stacks. Two such devices are; electrolysis cells in which water or another liquid is electrolytically dissociated into its components; and fuel cells, wherein hydrogen or another gaseous fuel and oxygen are combined, producing electricity in the process. Individual electrochemical cells of most such devices include sequentially at least an anode electrode, an anode chamber, a solid polymer electrolyte, a cathode chamber, and a cathode electrode. The electrodes and chambers are surrounded by cell frames to seal fluids within the anode and cathode chambers.

In use, admission of starting substances and discharge of resulting products from the respective anode and cathode chamber is achieved by through apertures within the cell frames and connecting channels that interconnect the through apertures with the chambers. As the electrochemical cells are stacked on top of each other, the through apertures in adjacent cell frames are aligned with each other so that starting substance fluids travel from cell to cell via aligned entry through apertures, and along entry connecting channels into an anode or cathode chamber. Resulting product fluids then leave opposed chambers through separate exit channels and travel out of the device through aligned exit through apertures.

Fluids passing through the chambers, connecting channels and through apertures are subject to operating pressures that could force the fluids out of the chambers or apertures at improper locations, resulting in malfunction of the electrochemical cell device. Potential sites of fluid leakage include interfaces between stacking sides of cell frames and adjacent cell components, as well as between anode or cathode chambers and their respective surrounding cell frames. Consequently, opposed stacking sides of the cell frames have sealing surfaces to minimize the risk of fluid leakage out of the chambers or through apertures.

Known sealing surfaces define patterns of raised ridges to minimize risks of fluid leakage. Upon compression within a stack of electrochemical cells, the ridges contact opposed surfaces of adjacent cell stack components to form multiple barriers to fluid movement along the sealing surface. Typically, a first pattern of raised ridges comprises raised ridges that form concentric rings around the through apertures, while a second pattern comprises raised ridges that form concentric rings around an interior perimeter of the cell frame that surrounds a chamber or electrode.

Existing cell frames are usually formed from polymeric materials such as polysulfone, and are occasionally made of composites or ceramics. Manufacture of the known patterns of raised ridges, therefore must be achieved through costly and time consuming procedures, such as fabrication of molds for injection molding techniques. Consequently, once the mold has been designed, locations of the through apertures and connecting channels are fixed, thereby substantially limiting design flexibility. Rather than simply drilling new apertures and channels into existing cell frames for purposes of design modification, costly new molds must be produced, so proper patterns of concentric raised ridges around new through apertures can be incorporated into the frame's sealing surfaces.

An additional limitation of known patterns of raised ridges forming concentric rings is that they are susceptible of incapacitating leakage as a result of a minor scratch across several adjacent rings. For example, if the rings surrounding a through aperture are scratched, the scratch establishes a leakage path to the pattern of ridges surrounding the interior perimeter of the cell. Those ridges in turn may provide leakage pathways to adjacent through apertures, or beyond the interior perimeter, to a chamber. Further, minor non-debilitating leakage pathways deteriorate into major debilitating leakage pathways when the fluids within the through apertures and chambers are operating at increased pressure levels.

Accordingly, it is the general object of the present invention to provide an improved sealing surface that overcomes the design flexibility, cost and reliability problems of the prior art.

It is a more specific object to provide a sealing surface that affords design modifications without need to re-design the entire sealing surface.

It is another specific object to provide a sealing surface that facilitates usage of one design of the surface in a variety of distinct applications, thereby limiting manufacturing costs of the surface.

It is yet another object to provide a sealing surface that tolerates minor scratches without resultant leakage of sealed fluids.

The above and other advantages of this invention will become more readily apparent when the following description is read in conjunction with the accompanying drawings.

DISCLOSURE OF THE INVENTION

An improved crossed-ridge sealing surface is disclosed for restricting leakage of fluids within multi-layered systems, such as an electrochemical cell. In a particular embodiment, the invention comprises an electrochemical cell having an anode electrode, an anode chamber, a solid polymer electrolyte, a cathode chamber, and a cathode electrode; at least one cell frame surrounding the electrodes and chambers to seal fluids within the chambers, wherein the frame defines through apertures and connecting channels to facilitate flow of starting substances and resulting products into and out of the chambers; and at least one crossed-ridge sealing surface on a stacking side of the frame. In accordance with the present invention, the crossed-ridge sealing surface comprises a first plurality of aligned ridges and a second plurality of aligned ridges that crosses the first plurality of aligned ridges, so that at least one sealing cell is defined by the crossing of the first and second pluralities of aligned ridges.

In application of the crossed-ridge sealing surface, a substantial portion of the stacking side of a cell frame is covered by the sealing cells, resulting in original through apertures or potential through aperture sites being surrounded by the cells. Consequently, experimental locations of the through apertures will not require a new pattern of ridges on the sealing surface of the cell frame. Additionally, a scratch through one or more sealing cells would only create a leakage pathway that terminates at a sealing cell adjacent a terminal end of the scratch.

BRIEF DESCRIPTION OF THE DRAWINGS

FIG. 3 is an exploded partial view of the FIG. 2 sealing surface, showing patterns of raised ridges forming concentric rings around a through aperture and an interior perimeter of a cell frame.

FIG. 4 is a plan view of a portion of a crossed-ridge sealing surface constructed in accordance with the present invention, showing a plurality of sealing cells.

FIG. 5 is an exploded partial view of the FIG. 4 crossed-ridge sealing surface.

FIG. 6 is a sectional view, taken along line 6—6 of FIG. 5, showing a plurality of sealing cells.

BEST MODE FOR CARRYING OUT THE INVENTION

Figure 1:
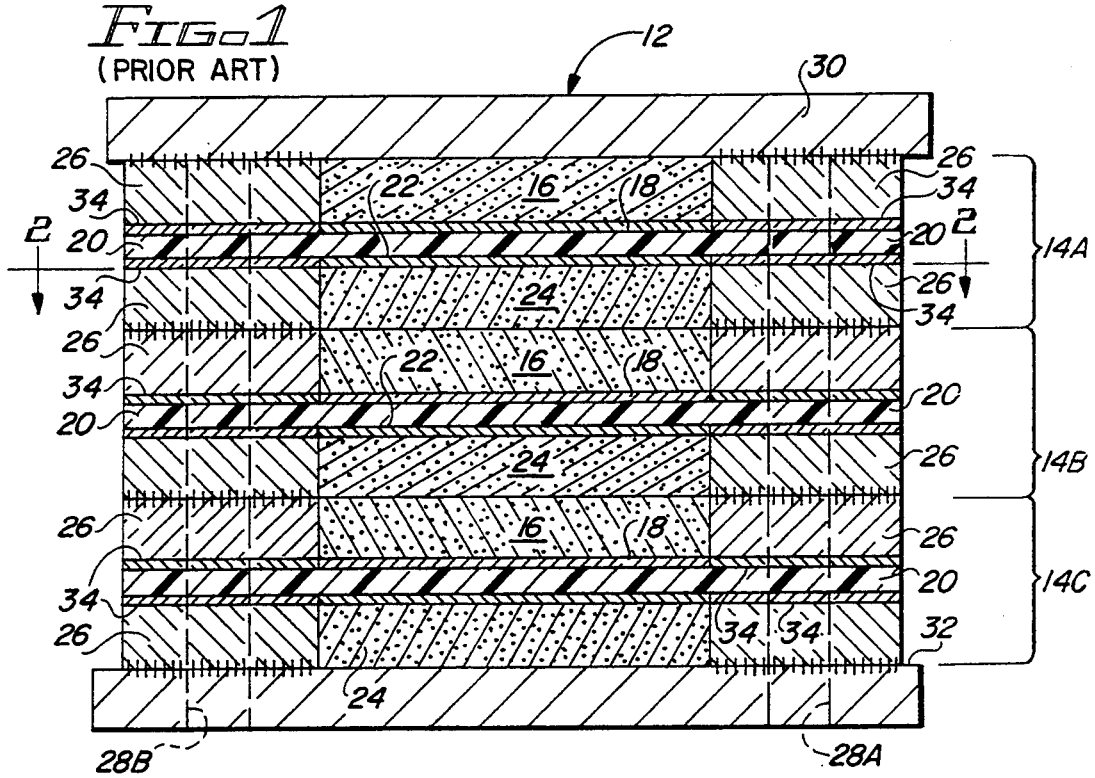
FIG. 1 is a cross-sectional view of an electrochemical cell device, showing three stacked individual electrochemical cells.

Referring to the drawings in detail, a crossed-ridge sealing surface of the present invention is shown in FIGS. 4-6, and generally designated by the reference numeral 10. As is best seen in FIG. 1, a known electrochemical cell device 12 is an appropriate environment for a particular embodiment of the crossed-ridge sealing surface 10. The electrochemical cell device 12 includes a vertical stack of a plurality of roughly identical electrochemical cells 14A, 14B, and 14C. Each of the electrochemical cells includes anode electrode 16, an anode chamber 18, a solid polymer electrolyte 20, a cathode chamber 22, and a cathode electrode 24. The anode and cathode electrodes 16, 24 and anode and cathode chambers 18, 22 are surrounded by cell frames 26 that define a plurality of through apertures 28A, 28B, 28C, 28D and 28E running vertically through the three vertically stacked cells 14A, 14B and 14C.

Figure 2:
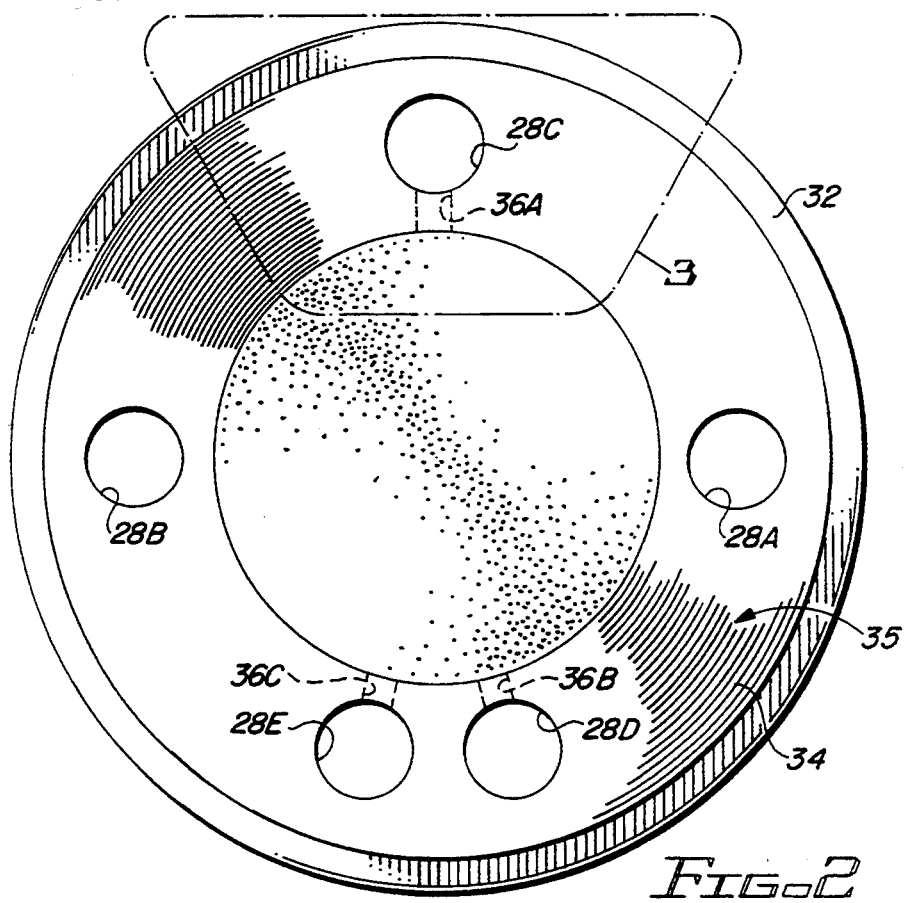
FIG. 2 is a sectional view, taken along the line 2—2 of FIG. 1, showing a prior art sealing surface of a cell frame.

The three cells are typically electrically connected in series, and are secured between an end plate 30 and a base plate 32 that also defines through apertures 28A–28E. As best seen in FIGS. 1 and 2, each cell frame 26 also includes a sealing surface 34 on a stacking side 35 of the frame 26 that is positioned to surround either an anode or cathode chamber 16, 22. Connecting channels 36A, 36B, and 36C are also defined by the cell frames 26 to provide fluid communication between the through apertures 28A–28E and anode or a cathode chamber 18, 22, such as connecting channels 36A–36C between through apertures 28C–28E shown in FIG. 2.

As best seen in FIG. 3, a prior art sealing surface 34 defines a first pattern 38 of raised ridges that forms a first plurality of concentric rings 40 around a through aperture, such as through aperture 28C, and a second pattern 42 of raised ridges that forms a second plurality of concentric rings 44 around an interior perimeter 46 of a cell frame 26. The FIG. 3 juxtaposition of the first and second patterns 38, 42 of raised ridges shows how minor scratches (not shown) across the ridges could create leakage pathways (not shown) between the patterns 38, 42, so that a pressurized fluid in through aperture 28C that passes through the first pattern 38 along such a pathway to the second pattern 42, could then travel along valleys between adjacent rings 44 to a further scratch-generated leakage pathway (not shown) leading into another through aperture or into the adjacent chamber 22, resulting in malfunction of the device 12.

According to the present invention, a crossed-ridge sealing surface 10 is defined in a sealing surface 34 of a cell frame's 26 stacking side 35. As best seen in FIG. 4, the crossed-ridge sealing surface includes a first plurality of aligned ridges 48 that crosses a second plurality of aligned ridges 50, so that a plurality of sealing cells 52 is defined by the crossing of the first and second pluralities of aligned ridges 48, 50, such as sealing cells 52A, 52B, 52C, 52D, 52E and 52F shown in FIGS. 5 and 6.

In the embodiment of the crossed-ridge sealing surface 10 shown in FIGS. 4–6, the alignment of the first plurality of aligned ridges 48 to each other is roughly parallel, as is the alignment of the second plurality of aligned ridges 50. However, any alignment of the respective ridges within either the first or second pluralities of aligned ridges that results in definition of sealing cells 52 upon the crossing of the first and second pluralities of aligned ridges 48, 50, is within the scope of the invention. Similarly, FIGS. 4 and 5 show the first plurality of aligned ridges 48 positioned roughly perpendicular to the second plurality of aligned ridges 50. The invention, however, includes any relative alignment of the first and second pluralities of aligned ridges 48, 50 that results in a definition of a plurality of sealing cells upon the crossing of the first and second pluralities of aligned ridges 48, 50.

The present invention will be clarified by the following illustrative examples. The examples are given to illustrate use of the crossed-ridge sealing surface. They are not, however, meant to limit the generally broad scope of the invention.

A layered test apparatus (not shown) was fabricated wherein fluids were sealed within the apparatus by crossed-ridge sealing surfaces between the layers. Three distinct crossed-ridge sealing surface designs were utilized under separate tests, wherein compressive sealing forces securing the layers together were adjusted to various specific levels, and the operating pressure of water, as a test fluid, was raised at each compressive force level, until leakage occurred.

A first, or wide-high crossed-ridge sealing surface design included first and second pluralities of aligned ridges that were roughly perpendicular to each other so that ridges measuring approximately 0.005" in height intersected to define square sealing cells approximately 0.050" wide by 0.050" long. At a compressive sealing force of approximately 2,200 PSI, the fluid in the apparatus leaked at approximately 400 PSIG. At a compressive sealing force of approximately 3,200 PSI, the fluid leaked at approximately 600 PSIG. And, at a compressive sealing force of approximately 4,300 PSI, the fluid leaked approximately 1,500 PSIG.

A second, or narrow-low crossed-ridge sealing surface design also included first and second pluralities of aligned ridges that were roughly perpendicular to each other so that ridges measuring approximately 0.0025" in height intersected to define square sealing cells approximately 0.025" wide by 0.025" long. At a compressive sealing force of approximately 2,200 PSI, the fluid in the apparatus leaked at approximately 500 PSIG. At a compressive sealing force of approximately 3,200 PSI, the fluid leaked at approximately 1,000 PSIG. And, at a compressive sealing force of approximately 4,300 PSI, the fluid leaked at approximately 2,800 PSIG.

A third, or wide-low crossed-ridge sealing surface design showed the best performance. It included first and second pluralities of aligned ridges that were roughly perpendicular to each other so that ridges measuring approximately 0.0025" in height intersected to define square sealing cells approximately 0.050" wide by 0.050" long. At a compressive sealing force of approximately 2,200 PSI, the fluid in the apparatus leaked at approximately 800 PSIG. At a compressive sealing force of approximately 3,200 PSI, the fluid leaked at approximately 2,800 PSIG. And, at a compressive sealing force of approximately 4,300 PSI, the fluid leaked at approximately 3,700 PSIG. All pressures in these examples are plus or minus 100.

As shown in FIG. 4, application of the crossed-ridge sealing surface of the present invention defines sealing cells 52 that surround a potential through aperture site 54, such as the broken line circle designating such a site in FIG. 4. In the event a new through aperture is needed, the potential through aperture site 54 is simply drilled, and the resulting new through aperture site (not shown) is surrounded by sealing cells 52, affording the same sealing capacity as that afforded original through aperture 28. Any scratch (not shown) appearing in the FIG. 4 crossed-ridge sealing surface 10 that does not extend between two through apertures, or between a through aperture and an interior perimeter 46 or exterior perimeter 56 of the cell frame 26, would necessarily produce a leakage pathway that terminates in a sealing cell 52, thereby minimizing probability of a debilitating leakage.

While the present invention has been described and illustrated with respect to a particular construction of an electrochemical cell device, it will be understood by those skilled in the art that present invention is not limited to this particular example. Accordingly, reference should be made primarily to the attached claims rather than the foregoing specification to determine the scope of the invention.

We claim:

1. A crossed-ridge sealing surface for restricting leakage of fluids within a multi-layered system which comprises:
   a. a sealing surface on a stacking side of one of the layers of the system that defines a plurality of through apertures passing through the surface;
   b. a first plurality of aligned ridges on the sealing surface; and
   c. a second plurality of aligned ridges on the sealing surface that crosses the first plurality of aligned ridges to define a plurality of sealing cells by the crossing of the first and second pluralities of aligned ridges, so that at least two sealing cells are defined between any two of the plurality of through apertures.

2. The crossed-ridge sealing surface of claim 1, wherein the ridges of the first plurality of aligned ridges are parallel to each other, and the ridges of the second plurality of aligned ridges are parallel to each other.

3. The crossed-ridge sealing surface of claim 2, wherein the ridges in the first plurality of aligned ridges are perpendicular to the ridges in the second plurality of aligned ridges, so that the sealing cells are square.

4. The crossed-ridge sealing surface of claim 3, wherein the ridges of the first and second pluralities of aligned ridges are about 0.0025 inches in height and each square sealing cell is about 0.050 inches wide by about 0.050 inches long.

5. A crossed-ridge sealing surface for restricting leakage of fluids in an electrochemical cell having sequentially an anode electrode, an anode chamber, a solid polymer electrolyte, a cathode chamber, a cathode electrode, and at least one cell frame surrounding the electrodes and chambers to seal fluids within the chambers, comprising:
   a. a sealing surface on a stacking side of one of the layers of the system that defines a plurality of through apertures passing through the sealing surface;
   b. a first plurality of aligned ridges on the sealing surface; and,
   c. a second plurality of aligned ridges on the sealing surface that crosses the first plurality of aligned ridges to define a plurality of sealing cells by the crossing of the first and second pluralities of aligned ridges, so that at least two sealing cells are defined between any two of the plurality of through apertures.

6. The crossed-ridge sealing surface of claim 5, wherein the ridges of the first plurality of aligned ridges are parallel to each other, and the ridges of the second plurality of aligned ridges are parallel to each other.

7. The crossed-ridge sealing surface of claim 6, wherein the ridges in the first plurality of aligned ridges are perpendicular to the ridges in the second plurality of aligned ridges, so that the sealing cells are square.

8. The crossed-ridge sealing surface of claim 7, wherein the plurality of through apertures facilitate the flow of starting substances and resulting products into and out of the chambers, and a plurality of square sealing cells surrounds the through apertures.

9. The crossed-ridge sealing surface of claim 8, wherein the ridges of the first and second pluralities of aligned ridges are about 0.0025 inches in height and each square sealing cell is about 0.050 inches wide about 0.050 inches long.

10. A crossed-ridge sealing surface for restricting leakage of fluids within a multi-layered system which comprises:
    a. a sealing surface on a stacking side of one of the layers of the system;
    b. a first plurality of aligned ridges on the sealing surface; and,
    c. a second plurality of aligned ridges on the sealing surface that crosses the first plurality of aligned ridges so that a plurality of sealing cells is defined by the crossing of the first and second pluralities of aligned ridges, wherein;
    the ridges of the first plurality of aligned ridges are parallel to each other, and the ridges of the second plurality of aligned ridges are parallel to each other;
    the ridges in the first plurality of aligned ridges are perpendicular to the ridges in the second plurality of aligned ridges, so that the crossing of the first and second pluralities of aligned ridges defines a plurality of square sealing cells; and
    the ridges of the first and second pluralities of aligned ridges are about 0.0025 inches in height and each square sealing cell is about 0.050 inches wide by about 0.050 inches long.

* * * * *